United States Patent
Rouda

(10) Patent No.: US 8,633,372 B2
(45) Date of Patent: Jan. 21, 2014

(54) LIGHT RECAPTURING SYSTEM AND METHOD

(76) Inventor: Trace Rouda, Columbus, OH (US)

( * ) Notice: Subject to any disclaimer, the term of this patent is extended or adjusted under 35 U.S.C. 154(b) by 413 days.

(21) Appl. No.: 12/848,622

(22) Filed: Aug. 2, 2010

(65) Prior Publication Data

US 2010/0298912 A1 Nov. 25, 2010

Related U.S. Application Data

(63) Continuation of application No. 11/754,111, filed on May 25, 2007, now abandoned.

(51) Int. Cl.
*H01L 31/00* (2006.01)
*H01L 31/042* (2006.01)
*H05B 41/46* (2006.01)

(52) U.S. Cl.
USPC .............. 136/243; 136/244; 136/252; 315/87

(58) Field of Classification Search
USPC .............................. 136/252, 243, 244; 315/87
See application file for complete search history.

(56) References Cited

U.S. PATENT DOCUMENTS

| | | | |
|---|---|---|---|
| 4,379,324 A | | 4/1983 | Thompson |
| 4,421,943 A * | | 12/1983 | Withjack ............... 136/246 |
| 4,568,521 A * | | 2/1986 | Spector ............... 422/124 |
| 4,816,970 A * | | 3/1989 | Garcia, Jr. ............. 362/183 |
| 4,918,357 A * | | 4/1990 | Waterbury ............. 315/87 |
| 6,637,916 B2 * | | 10/2003 | Mullner ............... 362/486 |
| 6,784,357 B1 * | | 8/2004 | Wang ............... 136/244 |
| 7,080,932 B2 | | 7/2006 | Keuper |
| 7,083,282 B1 | | 8/2006 | Sharp et al. |
| 2003/0223230 A1 * | | 12/2003 | Li ............... 362/216 |
| 2005/0257827 A1 | | 11/2005 | Gaudiana |
| 2007/0012349 A1 | | 1/2007 | Gaudiana et al. |
| 2007/0026571 A1 | | 2/2007 | Daniels et al. |
| 2007/0062572 A1 | | 3/2007 | Judd |

OTHER PUBLICATIONS

Randall, J.F., Designing Indoor Solar Products-Photovoltaic Technologies for AES, 2005, 1-11, John Wiley & Sons, Ltd.
Kornarka can power electrical devices, Konarka's Technology, Mar. 6, 2007, 1 page, available at http://www.konarka.com/technology/.

(Continued)

*Primary Examiner* — Jonathan Johnson
*Assistant Examiner* — Allison Bourke
(74) *Attorney, Agent, or Firm* — Standley Law Group LLP

(57) ABSTRACT

A system for recapturing light emitted by a light source and converting that light into electrical current which can be used to power the same light source or other devices. An exemplary embodiment may use photovoltaic cells to recapture light from ceiling lights and convert it into a source of power for the ceiling light. Another embodiment may be a tanning bed that recaptures light using photovoltaic cells. Some embodiments may recapture light from multiple lighting fixtures. An exemplary embodiment may include a computer and battery for storing energy produced by the photovoltaic cells. Another exemplary embodiment is a method of recapturing light emitted by a light source and converting the light into energy which can be used to power electrical activities.

4 Claims, 6 Drawing Sheets

(56) References Cited

OTHER PUBLICATIONS

Indigenous Energy Resources: The future of Renewable Energy and Distributed Power Generation, Virginia Natural Resources Leadership Institue-Session 5, pp. 1-6, A Partnership Program of the University of Virginia Institute for Environmental Negotiation, the Virginia Tech Center for Economic Education, and the Virgina Department of Forestry, Charlotteville, VA, 2005.

Pelley, Janet, Solar cells that harness infrared light, Technology News, Environmental Science & Technology Online News, Mar. 2, 2005, available at http://pubs.acs.org/subscribe/journals/esthag-w/2005/mar/tech/jp_solarcells.html.

Power Plastic for Cost-Effective Solar Cells, found Mar. 6, 2007, available at http://www.growthconsulting.frost.com/web/images.nsf/0/5631C25C150A0A3065257058001F894.

Bai, Y.W, and Chen, C.H., Using Solar Cells to Extend Standby Time of Handheld Computers (Abstract), 2005 International Journal of Power and Energy Systems.

Jewell, Mark, Wireless, flexible solar strips get Bush backing, The Daily Reporter, Mar. 5, 2007, pp. 1 & 12, Columbus, Ohio.

* cited by examiner

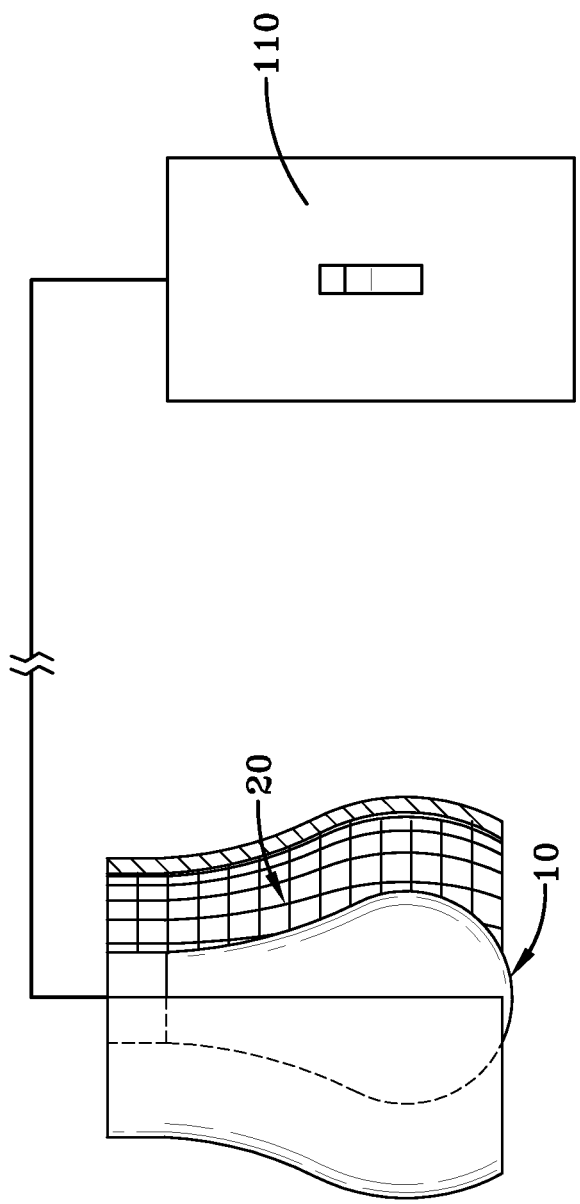
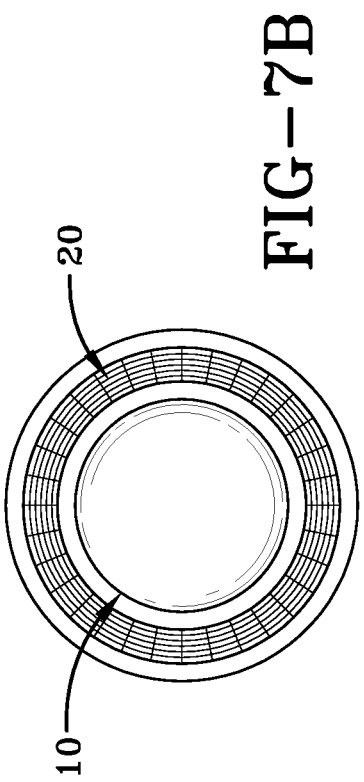
FIG-7A
FIG-7B

LIGHT RECAPTURING SYSTEM AND METHOD

CROSS-REFERENCE TO RELATED APPLICATIONS

This application claims is a continuation of U.S. application Ser. No. 11/754,111 filed May 25, 2007 and is herein incorporated by reference as if fully recited herein.

TECHNICAL FIELD

The embodiments disclosed herein relate to a system and method for conserving electrical energy. More particularly, the system and method provide the capacity to convert a portion of the radiation emitted from an electrical light source into electrical current which may then be routed via conducting means back into the light source or into another electrical expenditure.

BACKGROUND AND SUMMARY OF THE INVENTION

The U.S. national energy economy relies primarily on fossil fuel resources to power and heat our homes and commercially used facilities. According to reports, in 2002 less than 2% of the energy consumed in the United States was supplied by renewable energy sources such as hydroelectric, wind, solar, geothermal, and biomass. As non-renewable fossil fuel resources are consumed and depleted it becomes increasingly critical to manage our nation's energy needs.

A significant percentage of the energy consumed within the United States is used to run electrical lighting systems. While these lighting systems provide the light necessary for the maintenance of our facilities they also allow for energy waste. The typical lighting systems used in America utilize bulbs which expel light in 360 degrees though light is only needed in the area beneath or in front of the light source. Reflective surfaces have been used to direct most of the expelled light downward, but this configuration fails to take advantage of the light as an energy resource.

Photovoltaic cells use semiconductor technology to convert light into electric current without utilizing moving parts, burning fuel, or producing pollution. When light strikes the surface of a photovoltaic cell, electrons are dislodged and this produces a current of electricity. Exemplary embodiments disclosed herein provide for an arrangement of photovoltaic cells and an electrical light source, e.g., a fluorescent light bulb or plurality of said bulbs, in which the photovoltaic sensors convert radiation emitted from the light source into electrical current, which may then be routed back into the light source or to another electrical device via a conducting means.

Photovoltaic cells are commonly used outdoors where they convert the sun's light into electrical energy. Twenty to thirty percent of the sunlight that passes through photovoltaic cells is typically converted directly into electricity. The indoor use of photovoltaic cells is less common but known. The known art provides for photovoltaic cells that utilize electrical light sources to power small indoor appliances, but fails to show how photovoltaic cells may be incorporated into indoor electric light generating systems as means for reducing the overall energy consumption of the system.

In brief, an exemplary embodiment may comprise an array of photovoltaic elements as means for converting a portion of the radiation emitted from an electrical light source into electrical current which may then be reintroduced to the system as a means of reducing overall energy consumption. The photovoltaic elements are aligned with the electrical light source in a manner such that they may absorb a portion of the emitted radiation without interfering with the emitted light's functionality.

An exemplary embodiment of the invention disclosed herein has wide applications including, but not limited to, reducing the overall energy consumed by homes and commercial properties by recapturing a portion of the energy expelled from indoor electric light sources, converting that energy into electrical current, and reintroducing that electrical current into the electric light source or into some other energy expenditure, such as within the homes and commercial properties.

Further features of the invention will be described or will become apparent in the course of the following detailed description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein identical characters refer to identical parts and in which:

FIG. 7a is a perspective view of an exemplary embodiment of a light source and photovoltaic cell array of the present invention.

FIG. 7b is an elevational view of the light source and photovoltaic cell array of the exemplary embodiment shown in FIG. 7a.

FIG. 8b is a side perspective view of the exemplary embodiment shown in FIG. 8a.

FIG. 8c is a perspective view of a house containing the multiple sets of the light source and photovoltaic cell array shown in FIG. 8a.

FIG. 8d is an elevational view of the light source and photovoltaic cell array of the exemplary embodiment shown in FIG. 8a.

DETAILED DESCRIPTION OF EXEMPLARY EMBODIMENTS

The recapturing of light, for the purpose of an exemplary embodiment of the present invention, is defined as the interaction of light with at least one photovoltaic cell (e.g., a photovoltaic cell array) capable of converting a portion of the energy within the light into an electrical current. Similarly, for the purpose of an exemplary embodiment of the present invention, recaptured light is defined as light which has interacted with, for example, such a photovoltaic cell array making possible the production of an electrical current.

One exemplary embodiment of the present invention is a system for recapturing light emitted from a light source and converting the energy into electrical energy. In another exemplary embodiment of the present invention recaptured light is converted into electrical energy which powers the light source. Another exemplary embodiment of the present invention is a method for recapturing light emitted from a light source and using it to provide power to that same light source.

Figure 1:
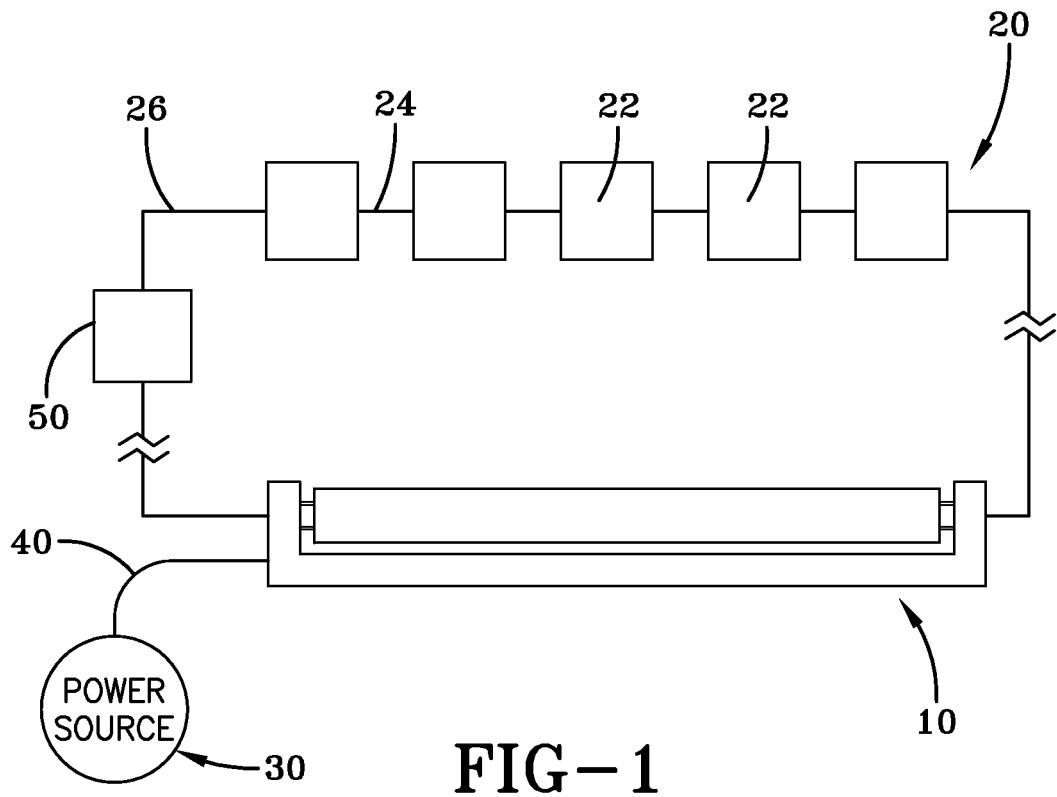
FIG. 1 is a perspective view of an exemplary embodiment of a system for recapturing light.
Figure 2:
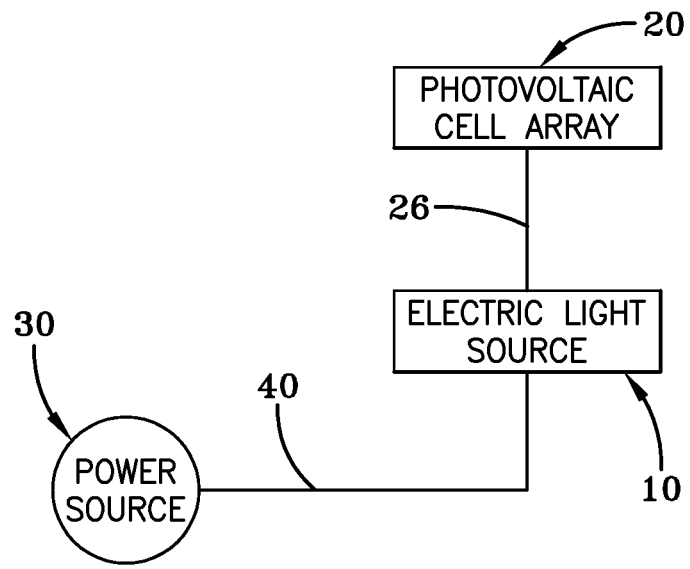
FIG. 2 is a schematic diagram of the system of FIG. 1.

FIGS. 1 and 2 show an exemplary embodiment of a system of the present invention. As shown, an exemplary embodiment may be comprised of a light source 10, a photovoltaic cell array 20, and a power source 30. In this system, the light source 10 is in electrical communication with the power source 30. In some embodiments of the present invention where the power source 30 is not integral with the light source 10, this electrical communication may occur through an electrical wire 40 that connects the light source 10 to the power source 30. An example of this would be a household light which is powered by a home electrical system. In other embodiments of the present invention where the light source 10 is in direct contact with the power source 30, such as when a light is powered by a battery, an electrical wire 40 may not be necessary.

Light source 10 may be any device which is able to expel light. As shown in the embodiment illustrated in FIG. 1, the light source 10 may be comprised of one or more light bulbs. In some embodiments of the present invention the light source 10 may be any type of light bulb including halogen, fluorescent, incandescent, and neon light bulbs.

As illustrated in FIGS. 1 and 2, the light source 10 may be in sufficient proximity to at least one photovoltaic cell (e.g., a photovoltaic cell array 20). Photovoltaic cell arrays 20 of the type used in this invention may be purchased from companies such as DMSOLAR.COM of Ft. Lauderdale, Fla. or SCADA SOLAR of Albuquerque, N. Mex. The photovoltaic cell array 20 converts light emitted from the light source 10 into electrical current. This conversion may be done by a plurality of photovoltaic cells 22 located within the photovoltaic cell array 20 that are electrically in communication with each other via a wiring member or system 24. Depending on the energy requirements of the system, the photovoltaic cells may be wired in parallel or in series. The wiring member or system 24 may also be in electrical communication with a conducting member or system 26 that may in turn be in electrical communication with the light source 10. When light hits the surface of the photovoltaic cell array 20, the photovoltaic cells 22 convert a portion of the energy into an electrical current which is transferred to the wiring member or system 24 and can then be conducted by the conducting member 26 to the light source 10. As shown in FIG. 1, in those embodiments where the photovoltaic cell array 20 produces a DC, or direct current, and the light source 10 runs on an AC, or alternating current, an inverter 50 may be in electrical communication with conducting member 26. The inverter 50 may convert DC current to AC current, so that the light source 10 can utilize the electrical current produced by the photovoltaic cell array 20.

Figure 3:
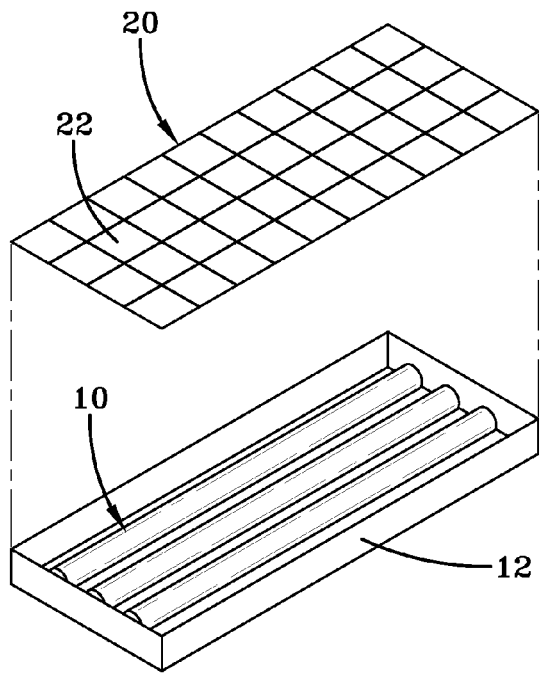
FIG. 3 is a side perspective view of an exemplary embodiment of a system for recapturing light.

In an exemplary embodiment of the present invention, and as shown in FIG. 3, the light source 10 is a ceiling light within a light housing 12, and the photovoltaic cell array 20 is a panel sized to fit within the back of the light housing 12. In this embodiment the photovoltaic cell array 20 is located between the light source 10 and the ceiling. In other embodiments of the present invention the photovoltaic cell array 20 may not be directly between the light source 10 and the ceiling, but may be located nearby on the ceiling, wall, or other surface such that it will not interfere with the functionality of the light source 10, but is still in a position that allows it to recapture light. While in the embodiment shown in FIG. 3 the photovoltaic cell array 20 forms only a portion of the light housing 12, in other embodiments of the present invention a photovoltaic cell array 20 may form an entire light housing. In some embodiments of the present invention the photovoltaic cell array 20 may have a cylindrical shape like a can and surround the light source 10.

Figure 4A:
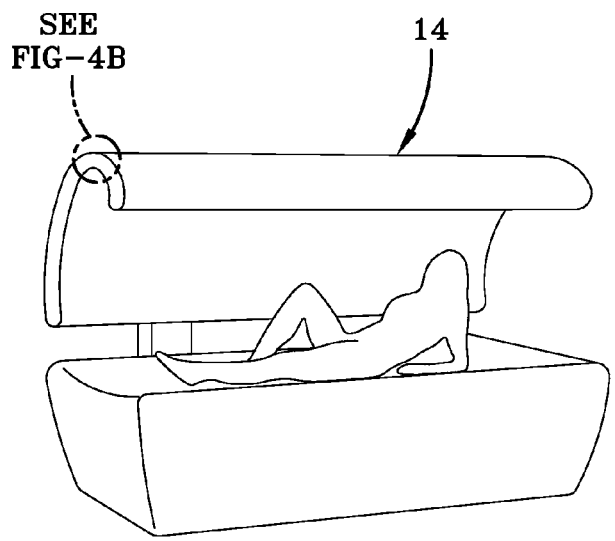
FIG. 4 is a perspective view of a tanning bed using an embodiment of the system of the present invention.
Figure 4B:
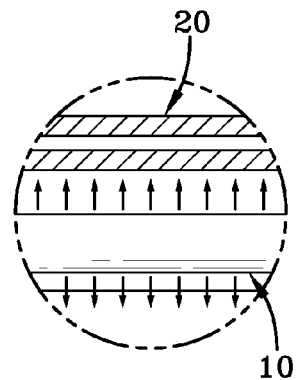

In other embodiments of the present invention the light source 10 may not be a ceiling light, but may be any other type of indoor light or lighting system. An example of such an embodiment is depicted in FIG. 4, where the light source 10 is a bulb within an indoor tanning chamber 14 and the photovoltaic cell array 20 is also housed in said tanning chamber 14. In some embodiments of the present invention the photovoltaic cell array 20 is positioned at distance from the light source 10 that is calculated to maximize the amount of light that the photovoltaic cell array 20 is able to receive, and minimize the interference with the emitted light traveling in the direction that the light source 10 is intended to provide light to.

Figure 5:
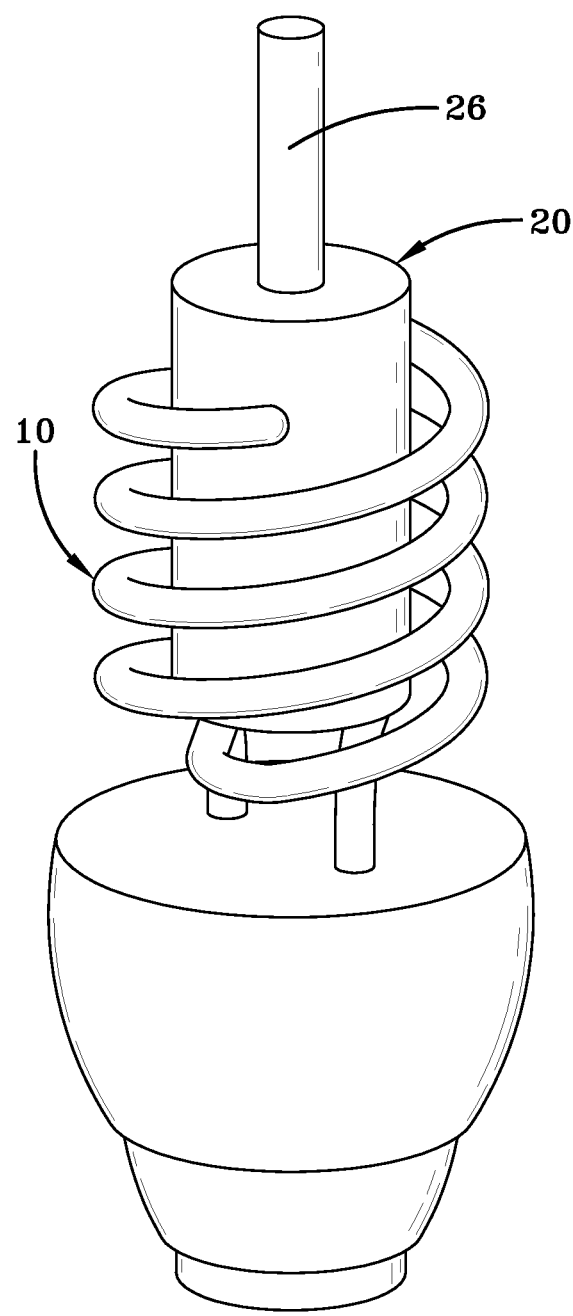
FIG. 5 is a side perspective view of an exemplary embodiment of the present invention.

In an exemplary embodiment of the system of the present invention and as shown in FIG. 5, the light source 10 may be a coiled tube (e.g., fluorescent) into which a photovoltaic cell array 20 having a tubular shape may be inserted. In other embodiments of the present invention, depending on the structure of the light source 10, the photovoltaic cell array 20 may take on any shape and may be located in any position that can recapture light preferably without substantially interfering with the functionality of the light.

In an exemplary embodiment of the system of the present invention, and as shown in FIG. 2, a portion of the energy that is received by the photovoltaic cell array 20 is converted by the photovoltaic cells 22 into an electrical current that may be used to power a light source 10 via the conducting member or system 26. In an exemplary embodiment the light source 10 that receives energy from the photovoltaic cell array 20 may be an electrical light source 10 and the same light source 10 that provides light to the photovoltaic cell array 20. In other embodiments of the present invention a photovoltaic cell array 20 may receive light from multiple light sources, electrical or not, and may provide power to multiple electrical light sources.

In some embodiments the amount of energy that is recaptured by the photovoltaic cell array 20 may be only a small fraction of the amount of energy needed to power a light source 20. For this reason the light source 10 in an exemplary system of the present invention may be configured to receive power from both the photovoltaic cell array 20 and a power source 30.

Some embodiments of the present invention may utilize a computer 70 in communication with the power source 30, and a battery 60 electrically connected to the light source 10 and photovoltaic cell array 20. Depending on the amount of power provided by the power source 30, or by any other parameter determined by a user, a computer 70 may be used to regulate the diversion of energy generated by the photovoltaic cell array 20 to a battery 60 for storage. The computer 70 may therefore regulate the amount of energy created by the photovoltaic cells 20 that is given to the light source 10 and the amount that is sent to the battery 60. In a similar fashion, the computer 70 may also dictate when the battery 60 supplies energy to the light source 10. For example, in a situation where the power source 30 fails or is shut off, the battery 60 may then provide energy to the light source 10. In some embodiments of the present invention that include a computer 70 and battery 60, the battery 60 may be electrically connected to appliances 80 or outlets 90 so that it may provide energy to those appliances 80 or outlets 90 when the power source 30 fails. In some embodiments of the present invention the computer 70 and battery 60 may be located in the basement 120 of a house 100. However, in other embodiments they may be located in other parts of a house 100 or other building that utilizes an exemplary system of the present invention.

Figure 6:
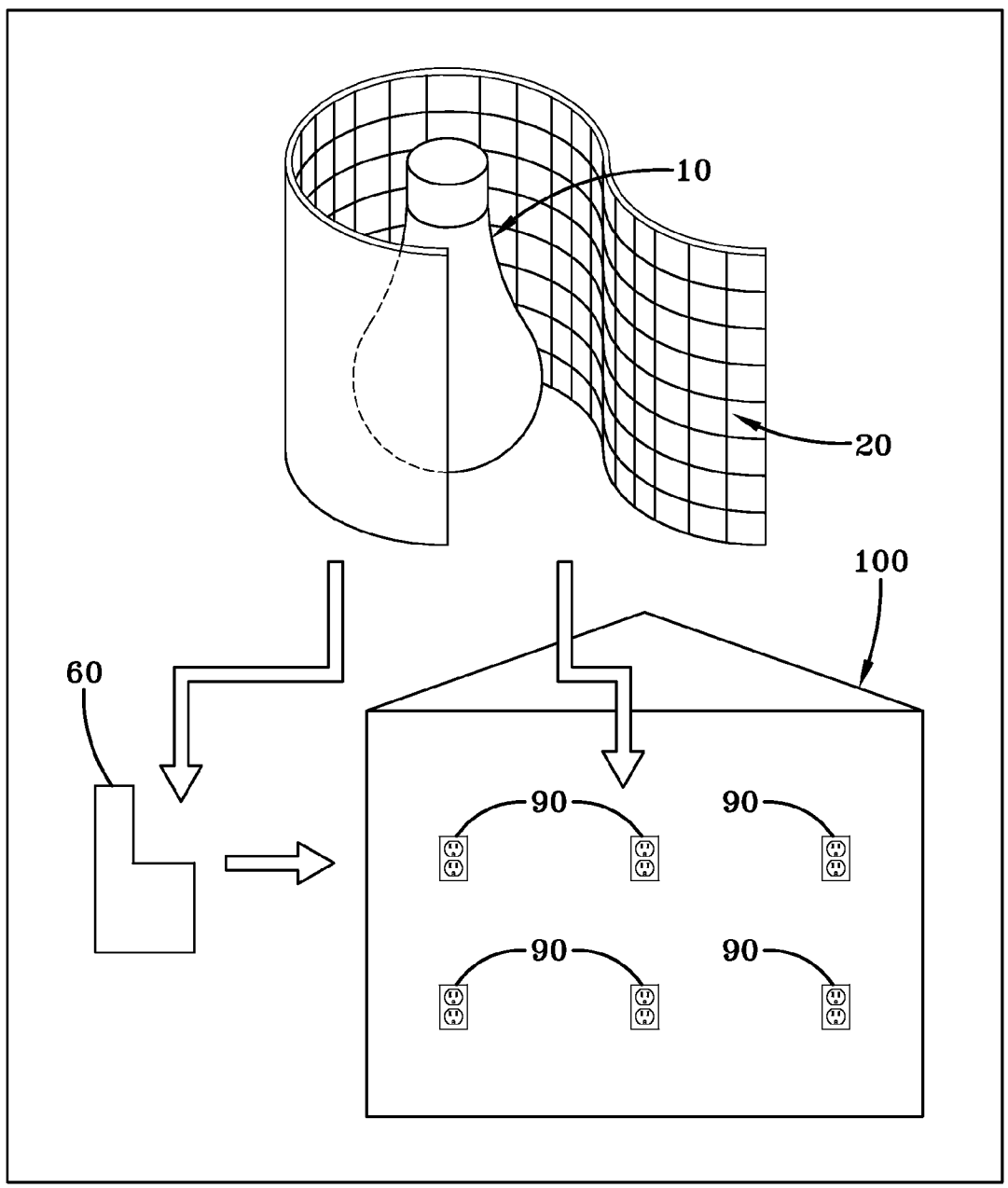
FIG. 6 is a schematic diagram of an exemplary embodiment of the present invention.

FIG. 6 shows an exemplary embodiment of the system of the present invention that includes a battery 60 for storing energy produced by the photovoltaic cell array 20. In this embodiment, the photovoltaic cell array 20 is shaped like a can that encircles the light source 10. Also shown in FIG. 6 is that the battery 60 may be used to power outlets 90 in a house 100.

FIG. 7a is an exemplary embodiment of the system of the present invention where the light source 10 is a standard light bulb that is controlled by a light switch 110. FIG. 7b shows an elevational view of the light source and photovoltaic cell array in FIG. 7a.

Figure 8A:
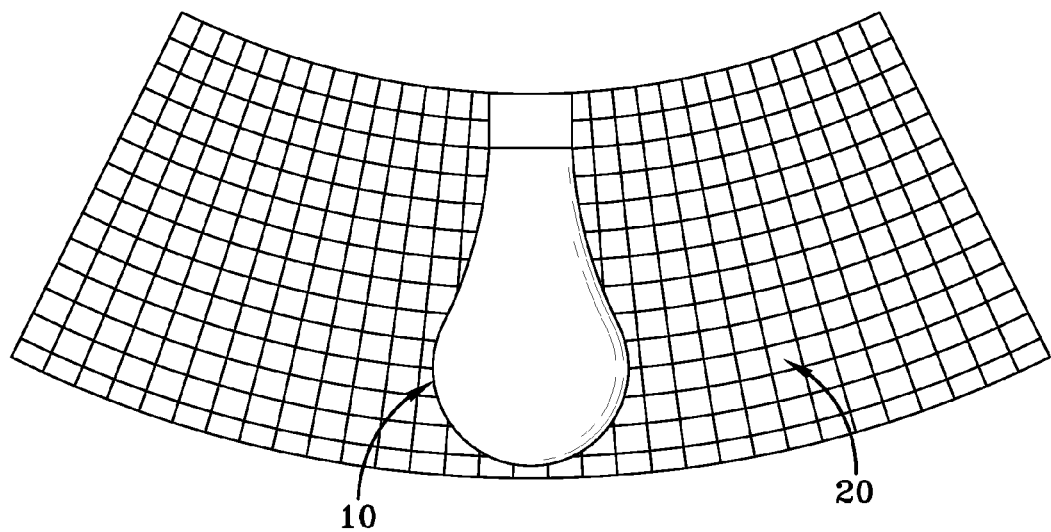
FIG. 8a is a perspective view of an exemplary embodiment of a light source and photovoltaic cell array of the present invention.
Figure 8B:
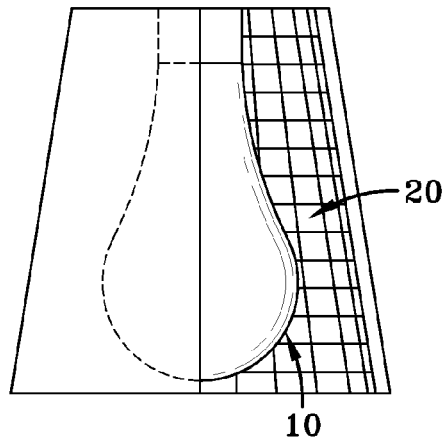
Figure 8D:
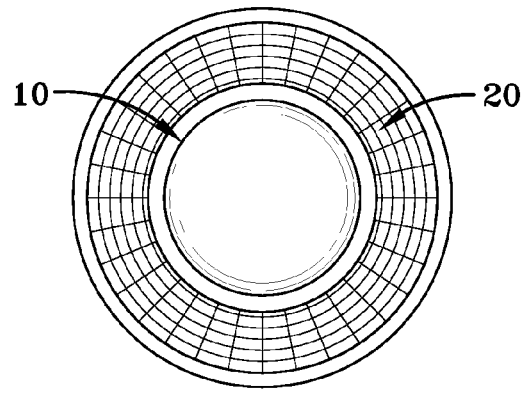
Figure 8C:
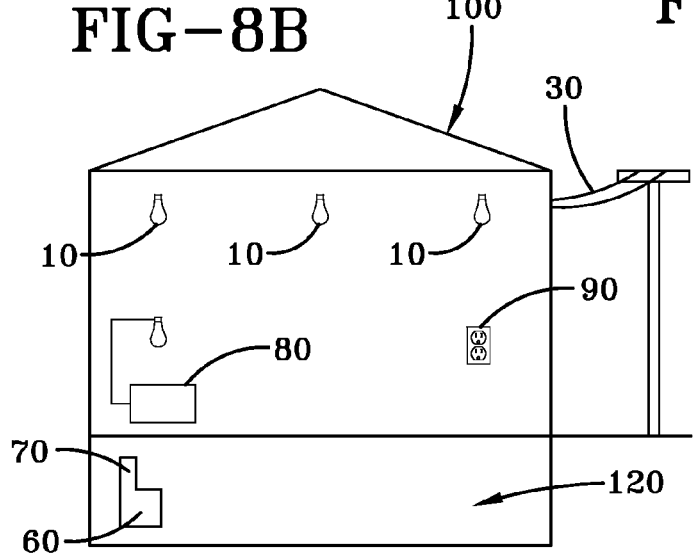

FIG. 8a is an exemplary embodiment of the light source 10 and photovoltaic cell array 20 of the present invention. FIG. 8b shows a side view of the light source 10 and photovoltaic cell array 20. FIG. 8c shows a house 100 that contains multiple light sources and photovoltaic cell arrays. As shown, a battery 60 and computer 70 is contained in the basement 120 of the house 100. While this exemplary embodiment shows the battery 60 and computer 70 together, in other embodiments of the present invention they may be separate, and located in different places throughout a house 100 or structure. FIG. 8c also shows that appliances 80 and outlets 90 in the house 100 may be powered by an exemplary embodiment of the present invention. FIG. 8d is an elevational view of the light source 10 and photovoltaic cell array 20 of FIG. 8a.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. An energy saving apparatus comprising:
    an electrical light source electrically connected to an inlet configured for receiving alternating current from an external power source, such light source being configured to provide light in a first path, and a second path;
    at least one photovoltaic cell arranged proximate to said light source such that light in said second path is captured by said at least one photovoltaic cell and is converted into direct current while light in said first path is unobstructed by said at least one photovoltaic cell;
    an inverter, arranged to convert the direct current into alternating current;
    a conducting member, reintroducing the alternating current from the inverter to the inlet of the light source to reduce the needed alternating current from the external power source driving the light source; and
    wherein said light source is a coil configuration and said second path is an area defined internal of the space created by the coil configuration, the space outer limits being the innermost diameter of said coil configuration.

2. The apparatus of claim 1, where said at least one photovoltaic cell is configured in a tubular shape with the photo-energy receiving surface of the photovoltaic cell being arranged on the outward facing surface of the tubular shape.

3. An apparatus for generating power from the light of an electrical light source comprised of:
    an inlet configured for receiving alternating current from an external power source;
    an electrical light source electrically connected to said inlet, said electrical light source configured to provide light in a first path, and a second path;
    at least one photovoltaic cell arranged proximate to said light source such that light in said second path is captured by said at least one photovoltaic cell and is converted into direct current while light in said first path is unobstructed by said at least one photovoltaic cell;
    an inverter, with an input electrically connected to receive direct current from the at least one photovoltaic cell and arranged to convert the direct current into alternating current;
    a conducting member, electrically connecting the inverter to the inlet, reintroducing the alternating current from the inverter to the inlet of the light source to reduce the needed alternating current from the external power source driving the light source; and
    wherein said light source is a coil configuration and said second path is an area defined internal of the space created by the coil configuration, the space outer limits being the innermost diameter of said coil configuration.

4. An apparatus for generating power from the light of an electrical light source comprised of:
    an inlet configured for receiving alternating current from external power source, said inlet electrically connected to an electrical light source configured to provide light in a first path, and a second path;
    at least one photovoltaic cell arranged proximate to said electrical light source such that light in said second path is captured by said at least one photovoltaic cell and is converted into direct current while light in said first path is unobstructed by said at least one photovoltaic cell;
    an inverter, arranged to convert the direct current into alternating current; and
    a conducting member, reintroducing the alternating current from the inverter to the inlet to reduce the needed alternating current from the external power source driving a connectable electrical light source; and
    wherein said light source is a coil configuration and said second path is an area defined internal of the space created by the coil configuration, the space outer limits being the innermost diameter of said coil configuration.

* * * * *